(12) United States Patent
Kawamoto

(10) Patent No.: US 8,054,325 B2
(45) Date of Patent: Nov. 8, 2011

(54) OPTICAL SCANNING APPARATUS, IMAGE FORMING APPARATUS AND CONTROL METHOD

(75) Inventor: Tomohiro Kawamoto, Abiko (JP)

(73) Assignee: Canon Kabushiki Kaisha (JP)

( * ) Notice: Subject to any disclaimer, the term of this patent is extended or adjusted under 35 U.S.C. 154(b) by 822 days.

(21) Appl. No.: 12/119,478

(22) Filed: May 12, 2008

(65) Prior Publication Data

US 2008/0285604 A1 Nov. 20, 2008

(30) Foreign Application Priority Data

May 14, 2007 (JP) .................. 2007-128544

(51) Int. Cl.
*B41J 2/435* (2006.01)
*B41J 2/47* (2006.01)

(52) U.S. Cl. ...................... 347/237; 347/247

(58) Field of Classification Search .......... 347/236, 347/237, 246, 247
See application file for complete search history.

(56) References Cited

U.S. PATENT DOCUMENTS

| 6,724,376 | B2* | 4/2004 | Sakura et al. ............... 345/204 |
| 6,917,639 | B2* | 7/2005 | Ishida et al. ............... 372/38.02 |
| 7,180,919 | B2* | 2/2007 | Kurusu ..................... 372/29.01 |
| 7,701,480 | B2* | 4/2010 | Omori et al. ............... 347/237 |

FOREIGN PATENT DOCUMENTS

JP 7-22679 A 1/1995

* cited by examiner

*Primary Examiner* — Hai C Pham
(74) *Attorney, Agent, or Firm* — Rossi, Kimms & McDowell LLP

(57) ABSTRACT

An optical scanning apparatus capable of being applied to an image forming apparatus includes a light source which emits a light beam; a modulator which pulse-width modulates drive current supplied to the light source; and a current adding unit which adds a supplemental current to the pulse-width modulated drive current at the rising edge of a pulse thereof.

8 Claims, 10 Drawing Sheets

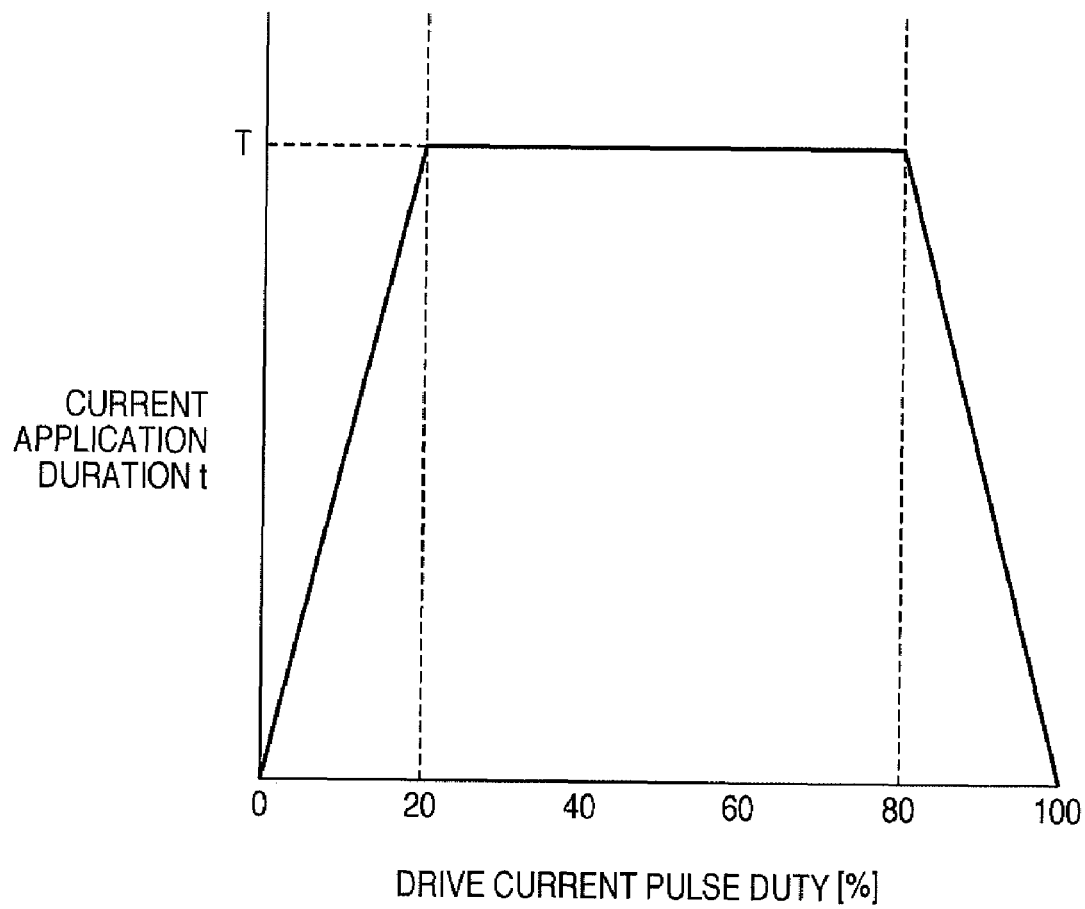

OPTICAL SCANNING APPARATUS, IMAGE FORMING APPARATUS AND CONTROL METHOD

BACKGROUND OF THE INVENTION

1. Field of the Invention

The present invention relates to an optical scanning apparatus that employs pulse-width modulation, an image forming apparatus having this optical scanner, and a method of controlling drive current.

2. Description of the Related Art

In order to express shades of gray of dots that form an image, an optical scanning apparatus varies the light-emission pulse width of a light beam emitted from a light source (laser). This is referred to generally as pulse-width modulation (PWM). For example, if a dark dot is formed, the optical scanning apparatus lengthens (broadens) the light-emission pulse width by PWM. Conversely, if a light dot is formed, the optical scanning apparatus need only shorten (narrow) the light-emission pulse by PWM. Thus, an advantage of using PWM is that shades of gray of a dot can be expressed without changing the amount of laser light (amount of light emitted).

However, owing to a variation in lens transmittance and a variation in photosensitivity of a photosensitive drum possessed by an image forming apparatus equipped with the optical scanning apparatus, a problem with the optical scanning apparatus is that image quality is not constant from one product to another. For example, consider a product A equipped with a lens having a high transmittance and a product B equipped with a lens having a low transmittance. Assume that the amount of laser light emission is the same in products A and B. In this case, since product A has a high lens transmittance, the amount of laser light that reaches the photosensitive drum is large. Conversely, since product B has a low lens transmittance, the amount of laser light that reaches the photosensitive drum is small. The image finally formed by product A has a density greater than that of the image formed by product B. Thus, even though the amounts of light emit from the lasers are equal, there is the danger that image density will not be constant between the two products depending upon such characteristics as the transmittance of the lenses and photosensitivity of the photosensitive drums. Such variations often depend upon machining precision in the manufacturing process and it is very difficult to eliminate them completely.

In an actual product, therefore, use is made of a method of suppressing variations in image quality by setting the amount of laser light used high or low in accordance with the variations. For example, in the case of a product equipped with a lens having a low transmittance or a product equipped with a photosensitive drum having poor photosensitivity, the amount of laser light need only be set to a large value. Conversely, in the case of a product equipped with a lens having a high transmittance or a product equipped with a photosensitive drum having good photosensitivity, it will suffice to set a small value for the amount of laser light.

It is known that with a light source such as a laser, the pulse width of drive current for realizing a target optical pulse width (the duty ratio of a binary current value supplied by a current source) differs depending upon the amount of laser light emission. For example, it is required that pulse width W1 of drive current for realizing a prescribed light-emission pulse width at a first light amount P1 be made larger than pulse width W2 of drive current at a second light amount P2 which is greater than the first light amount P1. Japanese Patent Laid-Open No. 07-022679 proposes a method of solving the problem of a diminished optical pulse width that accompanies an inadequate amount of light emission by making the pulse width of drive current relatively larger when the amount of light emission is relatively small.

However, the phenomenon of a reduction in light-emission pulse width that accompanies a shortfall in amount of light emission gives rise to another problem, namely a decline in the response speed of the light-emission pulses. That is, the rise time of the light-emission pulses becomes slower than the ideal time. As a consequence, density declines further or a shift in ideal dot formation position occurs.

SUMMARY OF THE INVENTION

Accordingly, the present invention seeks to solve at least one problem among this and other problems. For example, the present invention seeks to reduce variations in optical pulse width and response speed irrespective of whether the amount of light emitted is large or small. Other problems will be understood from the entirety of the specification.

The present invention is applicable to an optical scanning apparatus to an optical scanning apparatus, an image forming apparatus that uses this apparatus, and a method of controlling drive current supplied to a light source that emits a light beam. The optical scanning apparatus comprises, e.g., a light source which emits a light beam, and a modulator which pulse-width modulates drive current supplied to the light source. The optical scanning apparatus further comprises a current adding unit which adds a supplemental current to the pulse-width modulated drive current at the rising edge of a pulse thereof.

Further features of the present invention will become apparent from the following description of exemplary embodiments with reference to the attached drawings.

BRIEF DESCRIPTION OF THE DRAWINGS

FIG. 7 is a diagram illustrating an example of a look-up table for determining duration of current application according to the embodiment;

DESCRIPTION OF THE EMBODIMENTS

Embodiments of the present invention will be illustrated below. The individual embodiments described below will be useful in order to understand various concepts of the present invention, such as broader, intermediate and narrower concepts thereof. Further, the technical scope of the present invention is determined by the scope of the claims and is not limited by the individual embodiments set forth below.

[Hardware Configuration]

Figure 1:
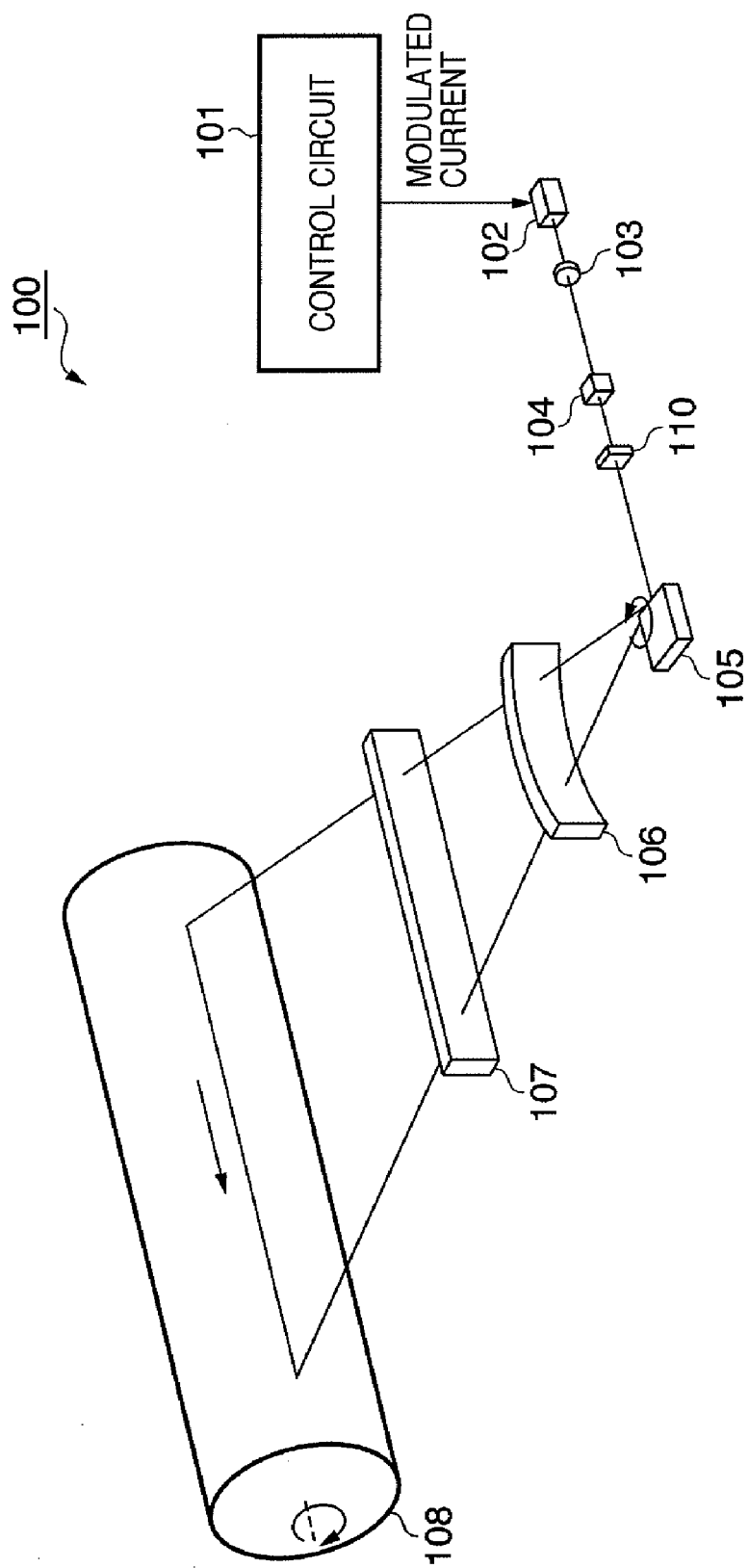
FIG. 1 is a diagram illustrating an example of an optical scanning apparatus according to an embodiment of the present invention.

FIG. 1 is a diagram illustrating an example of an optical scanning apparatus 100 according to an embodiment of the present invention. The optical scanning apparatus described here is used in an image forming apparatus. The optical scanning apparatus may also be referred to as a scanner apparatus or exposure apparatus.

The optical scanning apparatus 100 has a control circuit 101, a light source 102, a collimator lens 103, a cylinder lens 104, a beam shaping slit 110, a polygonal mirror 105, an f-θ lens 106 and an LDE lens 107. LDE stands for "long diffraction element". The control circuit 101 supplies drive current to the light source 102, such as a semiconductor laser. A light beam emitted from the light source 102 impinges upon the rotating polygonal mirror 105 through the collimator lens 103, cylinder lens 104 and beam shaping slit 110. The light beam, which has been deflected by the polygonal mirror 105, is scanned across a rotating photosensitive drum 108 through the f-θ lens 106 and LDE lens 107. An electrostatic latent image is formed on the photosensitive drum 108 by repeating this series of operations.

Figure 2:
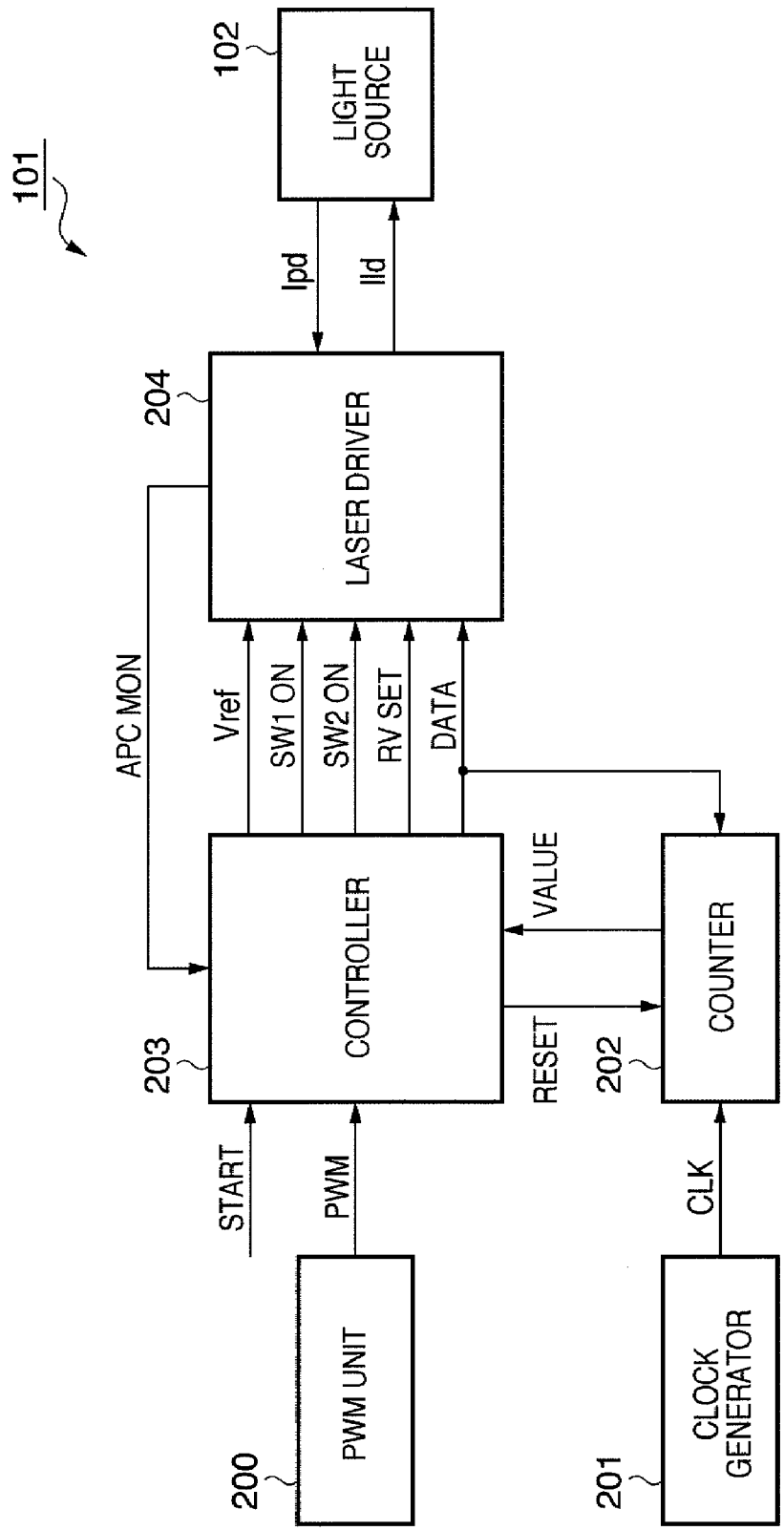
FIG. 2 is a diagram illustrating an example of a control circuit according to the embodiment.

FIG. 2 is a diagram illustrating an example of a control circuit according to the embodiment. The control circuit 101 includes a PWM unit 200, a clock generator 201, a counter 202, a controller 203 and a laser driver 204. On the basis of image grayscale data (image information), the PWM unit 200 generates data for producing the drive current supplied to the light source. The laser driver 204 accepts generated DATA and pulse-width modulates the drive current. The PWM unit 200 and laser driver 204 constitute one example of a pulse-width modulating unit.

The clock generator 201 generates a clock (CLK) and supplies the clock to the counter 202. The counter 202 performs counting in synch with the clock and supplies the count value (VALUE) to the controller 203. It should be noted that the counter 202 is reset by a reset signal (RESET) supplied from the controller 203.

The controller 203 is a circuit having capabilities equivalent to those of a CPU, RAM and ROM. The controller 203 sets a reference voltage Vref, which is for setting the target amount of light of the light beam, in the laser driver 204. Further, the controller 203 outputs a resistance-value setting value (RV SET), which is for setting the value of a variable resistor RV of laser driver 204. When an image is formed, an image-formation start signal (START) is input to the controller 203 from an engine controller (not shown). Further, PWM data, which is pulse-width information, is input to the controller 203 from the PWM unit 200.

In accordance with the target amount of light that has been set, the laser driver 204 generates and supplies drive current for driving the light source 102 and pulse-width modulates drive current supplied to the light source 102. It should be noted that the controller 203 and laser driver 204 function as an example of a current adding unit for adding a supplemental current to the pulse-width modulated drive current at the rising edge of the pulse thereof, as will be described later.

Figure 3:
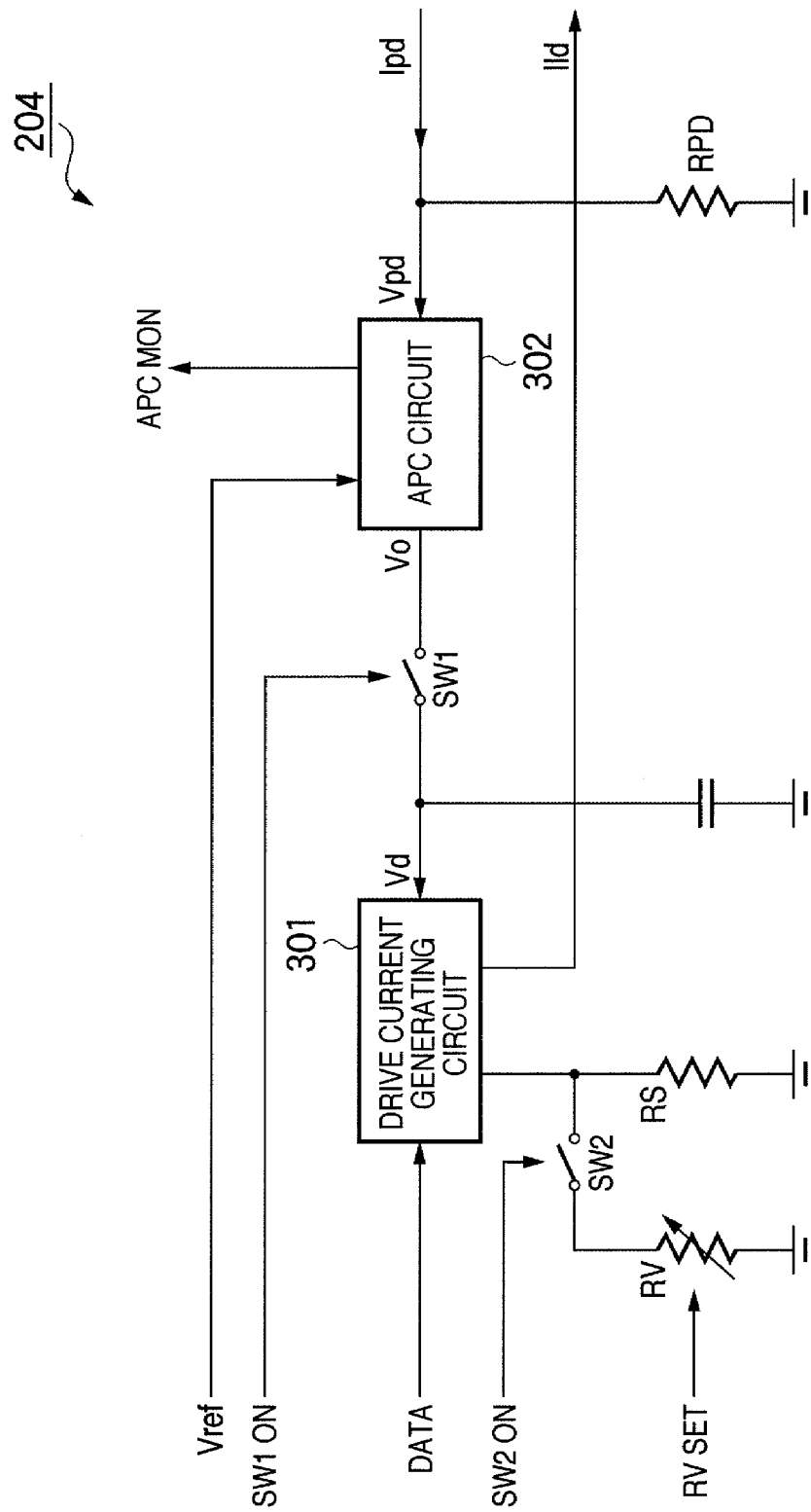
FIG. 3 is a diagram illustrating an example of a laser driver according to the embodiment.

FIG. 3 is a diagram illustrating an example of the laser driver 204 according to the embodiment. A drive current generating circuit 301 generates a drive current Ild, which is for driving the light source 102, in accordance with the data signal (DATA) that has entered from the controller 203. On the basis of a monitor current Ipd for monitoring the amount of light emission of the light source 102, an APC circuit 302 adjusts the drive current in such a manner that the amount of light from the light source 102 will become the target amount of light. A current/voltage converting resistor RPD is a resistance element for converting the monitor current Ipd to a voltage value Vpd.

The drive current Ild is determined by a switching resistor RS and a variable resistor RV. With a switch SW2 in the open state, a current IH determined solely by the switching resistor RS flows. With the switch SW2 in the closed state, on the other hand, a current IL determined by the switching resistor RS and variable resistor RV flows. That is, the switch SW2 is turned on (closed)/turned off (opened) by a switching signal (SW2 ON) that is output from the controller 203, whereby the value of the drive current Ild is determined (adjusted).

Figure 4:
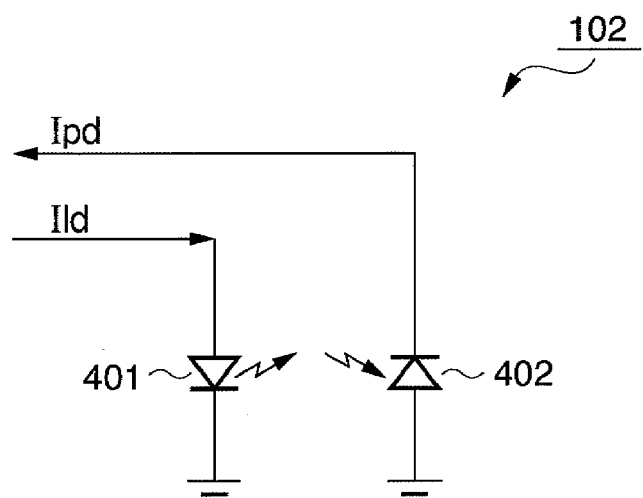
FIG. 4 is a diagram illustrating an example of a light source according to the embodiment.

FIG. 4 is a diagram illustrating an example of the light source 102 according to this embodiment. The light source 102 has a laser diode 401 and a photodiode 402. The laser diode 401 emits a light beam in an amount that conforms to the drive current Ild supplied from the laser driver 204. The photodiode 402 receives the light beam emitted by the laser diode 401 and outputs the monitor current Ipd corresponding to the amount of light received. The monitor current Ipd is input to the APC circuit 302 of laser driver 204.

[Principle of Control Method]

Figure 5:
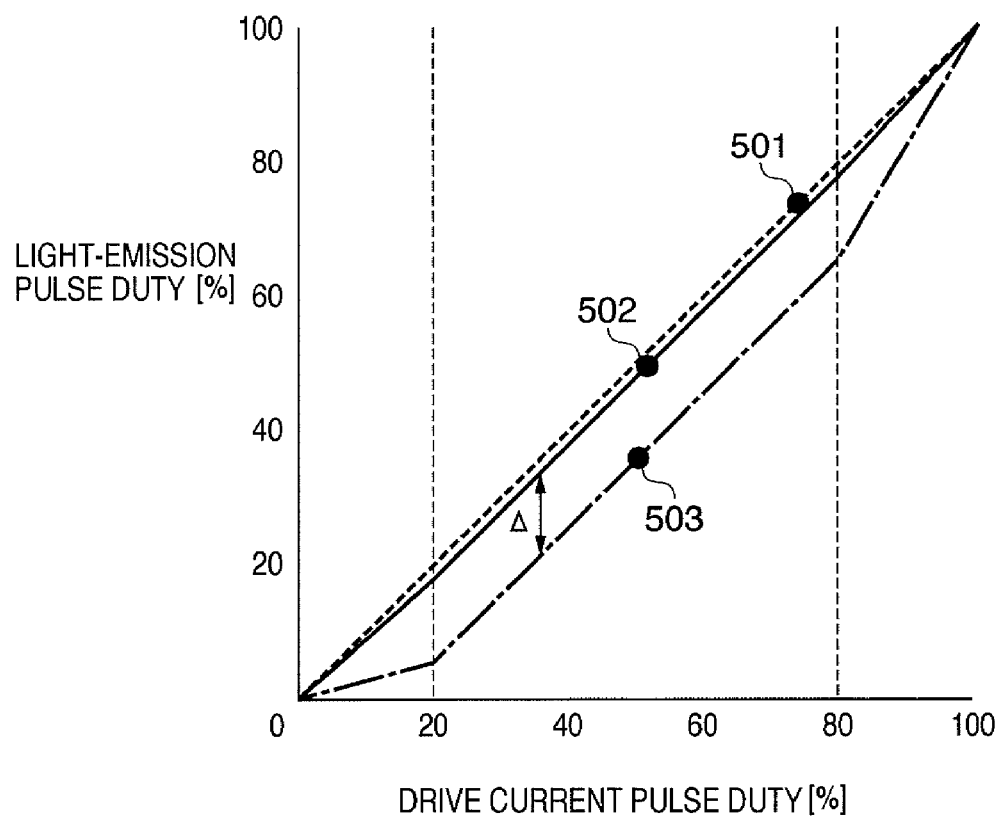
FIG. 5 is a diagram illustrating the corresponding relationship between duty ratio of a drive current pulse and duty ratio of a light-emission pulse in an ordinary laser.

FIG. 5 is a diagram illustrating the corresponding relationship between duty ratio of a drive current pulse and duty ratio of a light-emission pulse in an ordinary laser. Here this corresponding relationship shall be referred to as a "linearity characteristic". The duty ratio of the drive current pulse and the duty ratio of the light-emission pulse are plotted along the horizontal and vertical axes, respectively, in FIG. 5. It is assumed that the laser diode 401 has such a characteristic that the width of the pulse of the light beam becomes progressively smaller than the ideal width as the target amount of light (amount of light emitted) declines.

The dashed line 501 in FIG. 5 is a base line in a case where the corresponding relationship between the duty ratio of the drive current pulse and the duty ratio of the light-emission pulse is linear. The solid line 502 indicates the linearity characteristic when the amount of light emitted is PH. The dot-and-dash line 503 indicates the linearity characteristic when the amount of light emitted is PL (PH>PL).

In general, the smaller the amount of light emitted, the more the progressive delay in the rising edge of the light-emission pulse. Consequently, the width of the light-emission pulse when the amount of light emitted is PL becomes smaller (narrower) than the width of the light-emission pulse when the amount of emitted light is PH. That is, the smaller the amount of light emitted, the smaller the width of the light-emission pulse.

In accordance with FIG. 5, it will be appreciated that the linearity characteristic when the amount of light emitted is PL is shifted downward in comparison with the base line and in comparison with the linearity characteristic when the amount of light emitted is PH. Further, the shift brings about a decline in response speed at the rising edge of the light pulse. Furthermore, with particular regard to the density of a dot when an image is formed, dot density falls below the ideal density if the pulse width becomes smaller than the ideal width.

Figure 6A:
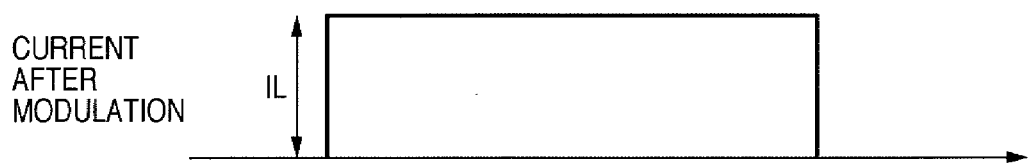
FIG. 6A is a diagram illustrating an example of pulse-width modulated drive current.

FIG. 6A is a diagram illustrating an example of pulse-width modulated drive current. Here the amplitude (IL) of drive current indicates a current value that prevails when the target amount of light has been set to PH.

Figure 6B:
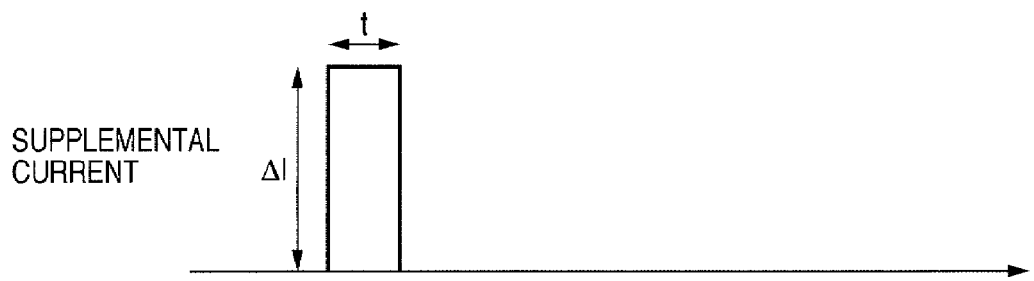
FIG. 6B is a diagram illustrating an example of supplemental current added to pulse-width modulated drive current.

FIG. 6B is a diagram illustrating an example of supplemental current added to pulse-width modulated drive current. Here $\Delta I$ indicates the current value of the supplemental current, and t represents the duration over which the supplemental current is applied.

Figure 6C:
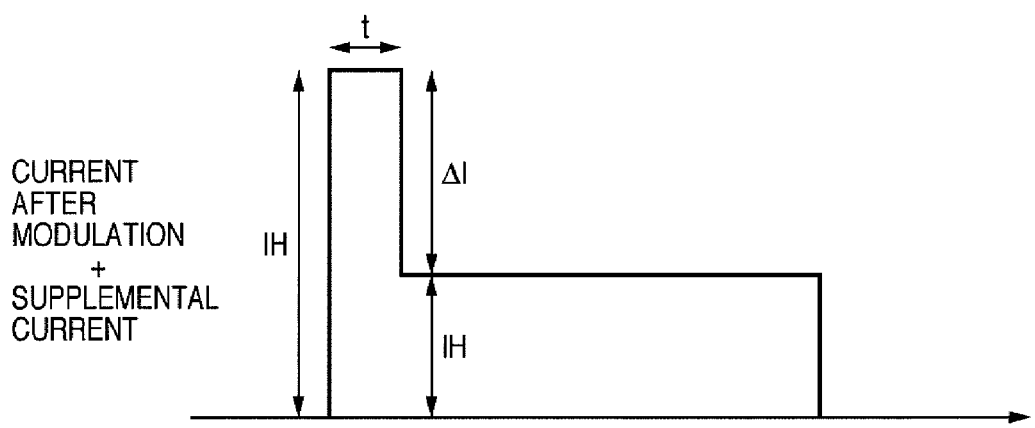
FIG. 6C is a diagram illustrating a current that is the sum of pulse-width modulated drive current and supplemental current.

FIG. 6C is a diagram illustrating a current that is the sum of pulse-width modulated drive current and supplemental current. Here IH indicates the current value of the drive current when the target amount of light has been set to PH. The above-mentioned $\Delta I$ can be expressed as the difference between IH and IL. That is, $\Delta I = IH - IL$. It will be understood from FIG. 6C that the supplemental current has been added onto the drive current pulse at the leading edge portion of the pulse.

It is desired that the current value $\Delta I$ of the supplemental current be determined so as to compensate for the amount of decrease in the pulse width of the light beam relative to the ideal width. As mentioned above, the smaller the amount of light emitted (the target amount of light), the more the response characteristic of the rising edge of the light pulse is delayed and therefore the narrower the pulse width of the light pulse becomes. Accordingly, if the current value $\Delta I$ of the supplemental current is set in such a manner that the smaller the target amount of light, the larger $\Delta I$ becomes, then compensation will be made for the amount of decrease in the pulse width of the light beam relative to the ideal width. For example, in order to make the pulse width and response speed when the target amount of light is PL approach the pulse width and response speed when the target amount of light is PH, the current value $\Delta I$ of the supplemental current should be set so as to be the difference between IH and IL. The ideal width in this case is the pulse width when the target amount of light is PH. Consequently, the ideal pulse width may be referred to as the required pulse width or desired pulse width.

In this embodiment, the controller 203 functions as an example of a determining unit for determining the value of the supplemental current. For example, the controller 203 stores the amount of light emission (current value) for attaining the ideal density in a memory beforehand. The controller 203 then determines the current value $\Delta I$ of the supplemental current from the difference between the stored amount of light emission and the target amount of light. The stored amount of light emission may be determined by forming different patch patterns of respective developer densities and measuring the respective optical densities. It would be desirable if the stored amount of light emission were a value that is a common indicator between products.

It is also preferred that the duration t during which the supplemental current is applied be determined so as to compensate for the amount of decrease in the pulse width of the light beam relative to the ideal width. It will be understood from FIG. 5 that in the region in which the duty ratio of the drive current pulse is 20 to 80%, pulse width diminishes substantially uniformly (the difference $\Delta I$ in pulse width is constant). By contrast, in the region in which the duty ratio of the drive current pulse is 0 to 20%, pulse width diminishes gradually (the difference $\Delta I$ in pulse width increases) as the duty ratio increases. Conversely, in the region in which the duty ratio of the drive current pulse is 80 to 100%, the pulse width increases (the difference $\Delta I$ in pulse width decreases) as the duty ratio increases. Accordingly, it will suffice to determine current application duration t taking this characteristic into consideration.

FIG. 7 is a diagram illustrating an example of a look-up table for determining current application duration according to the embodiment. This look-up table stores the corresponding relationship between current application duration t and duty ratio of the drive current pulse.

In accordance with FIG. 7, the current application duration t lengthens gradually in the region in which the duty ratio is 0 to 20%. Further, the current application duration t is held at any value T in the region in which the duty ratio is 20 to 80%. The current application duration t shortens gradually in the region in which the duty ratio is 80 to 100%.

It should be noted that in accordance with FIG. 7, the current application duration t is controlled so as to be linear with respect to duty ratio in each of the regions of duty ratio 0 to 20% and 80 to 100%. However, this is merely one example. In actuality, control may be exercised in such a manner that the current application duration t is non-linear in conformity with the linearity characteristic of the laser. What matters is that it will suffice if final compensation is made for the amount of decrease in the pulse width of the light beam relative to the ideal width.

It is assumed that the controller 203 has stored this look-up table in a storage unit such as a memory. It should be noted that the controller 203 may calculate the current application duration t from the duty ratio of the drive current pulse using one or more arithmetic formulae corresponding to the look-up table.

[Amount of Light/Current Control Method]

Figure 8:
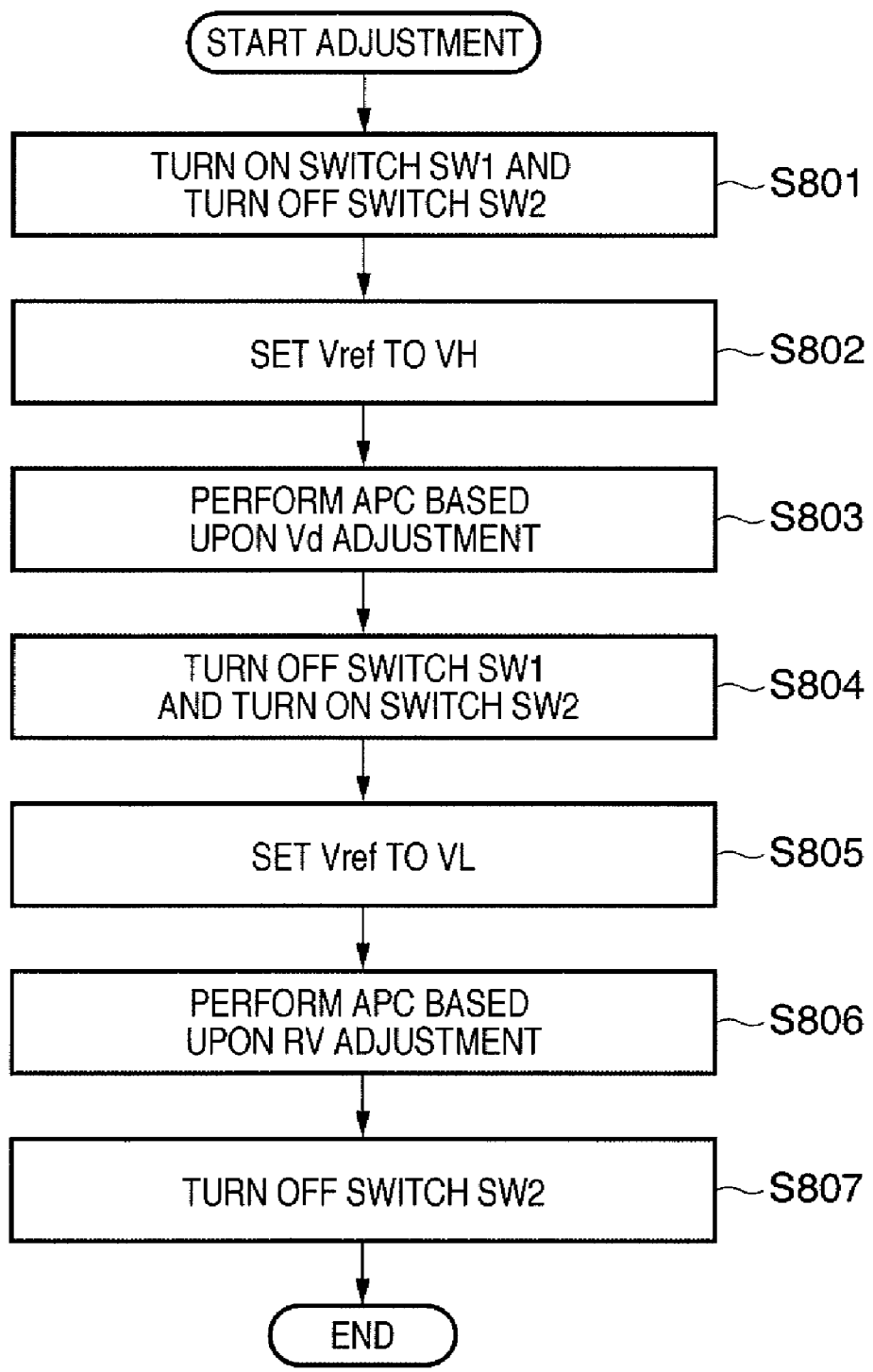
FIG. 8 is a flowchart illustrating an example regarding APC according to the embodiment.

FIG. 8 is a flowchart illustrating an example regarding APC according to the embodiment. First, the current value IH when the target amount of light has been set to PH is determined, then the current value IL when the target amount of light has been set to PL is determined. The difference between the current value IH and the current value IL corresponds to the value $\Delta I$ of supplemental current, as mentioned above.

At step S801, the controller 203 sets the drive current Ild to IH. For example, the controller 203 turns on the switch SW1 and turns off the switch SW2 in the laser driver 204. In order to set the drive current Ild to IH, the switching resistor RS must be used and not the variable resistor RV. The switch SW is opened (turned off) for this reason. The switch SW1 is closed (turned on) subsequently in order to execute APC.

At step S802, the controller 203 sets the reference voltage Vref of the APC circuit 302 in laser driver 204 to VH. The reference voltage Vref corresponds to the target amount of light in APC, and VH is the voltage value for setting the target amount of light to PH.

At step S803, the APC circuit 302 of laser driver 204 starts APC. The laser driver 204 forcibly fires the laser diode 401 and receives the monitor current Ipd from the photodiode 402. The monitor current Ipd is converted to the voltage value Vpd by the current/voltage converting resistor RPD. The APC circuit 302 compares the reference voltage VH and the voltage value Vpd and adjusts the value of voltage Vd that is input to the drive current generating circuit 301. Since the switch SW1 is on in this state, Vd=Vo holds. When APC ends, adjustment of the value of Vd is completed in such a manner that the laser diode 401 fires at the amount PH of light.

Next, the drive current IL that prevails when the target amount of light has been set to PL is determined. At step S804, the controller 203 turns off the switch SW1 and turns on the switch SW2. Turning off the switch SW1 releases Vo and Vd. This is to prevent Vd from changing when APC is subsequently executed. The variable resistor RV is connected in parallel with the switching resistor RS by turning on the switch SW2. As a result, the current that is output from the drive current generating circuit 301 is shunted through the switching resistor RS and variable resistor RV. The current applied to the laser diode 401, therefore, is reduced. That is, the amount of light emitted by the laser diode 401 declines.

At step S805, the controller 203 sets VL at the reference voltage terminal of the APC circuit 302. Here VL is a voltage value that prevails when the target amount of light has been set to PL. At step S806, the laser driver 204 starts APC. First, the drive current generating circuit 301 forcibly fires the laser diode 401. The APC circuit 302 receives the monitor current Ipd from the photodiode 402. The monitor current Ipd is converted to the voltage value Vpd by the current/voltage converting resistor RPD. The APC circuit 302 compares VL, which has been set as the reference voltage, and the voltage value Vpd. The result of this comparison is output to the controller 203 as a monitor signal (APC_MON).

If the monitor signal (APC_MON) indicates that the actual amount of light emitted is greater than the target amount PL of light, then the controller 203 enlarges the value of the variable resistor RV and diminishes the drive current Ild. Conversely, if the monitor signal (APC_MON) indicates that the actual amount of light emitted is less than the target amount PL of light, then the controller 203 diminishes the value of the variable resistor RV and enlarges the drive current Ild. The value of the variable resistor RV is set by the resistance-value setting signal (RV SET) that is output by the controller 203.

When APC is completed, control proceeds to step S807. Here the controller 203 turns off (opens) the switch SW2. With the switch SW2 in the off state, a current of current value IH is applied to the laser diode 401. On the other hand, if the switch SW2 is turned on (closed), a current of current value IL is applied to the laser diode 401. It should be noted that by turning off (opening) the switch SW2 in advance, the current value of the drive current pulse at the rising edge thereof becomes IH (see FIG. 6C).

Figure 9:
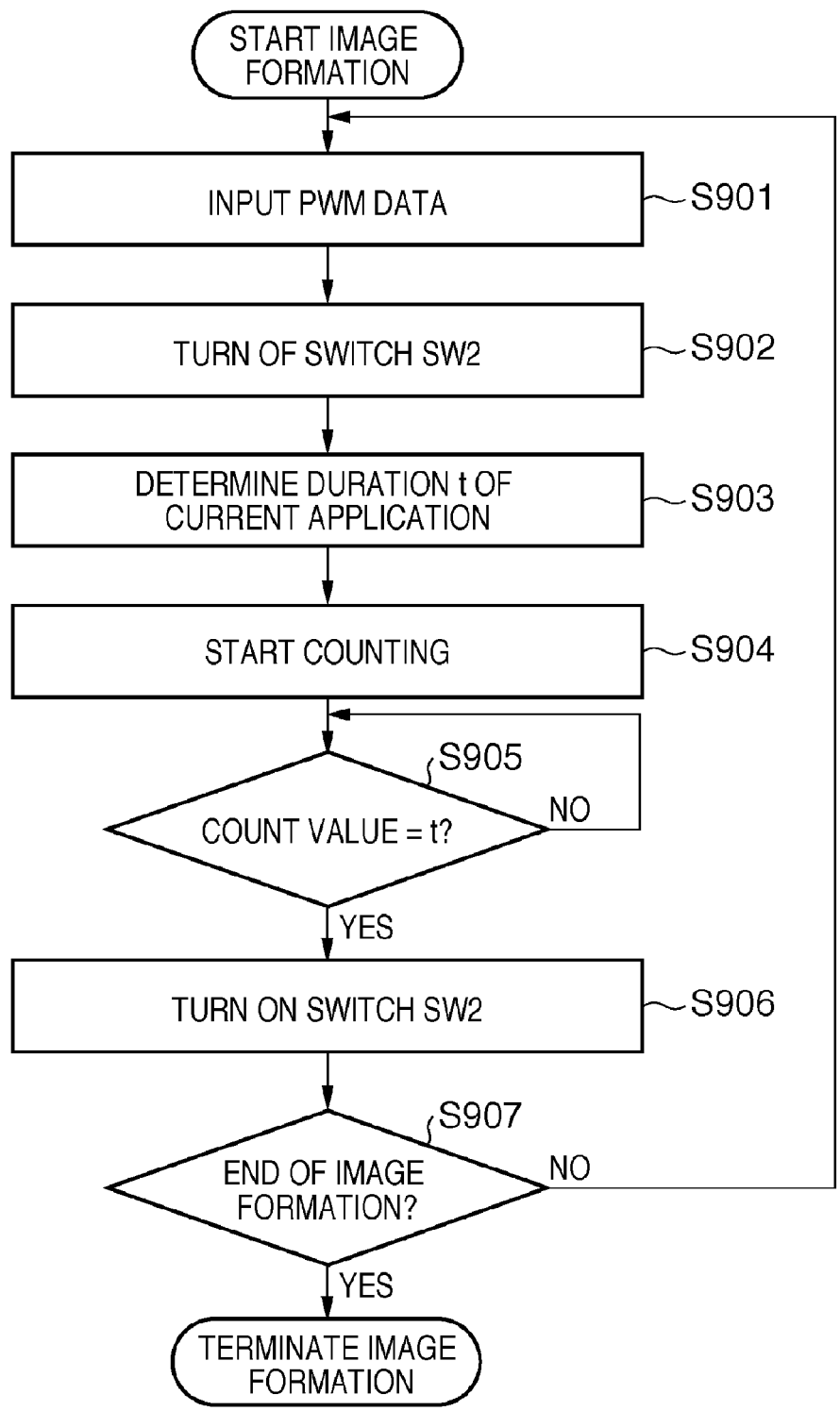
FIG. 9 is a flowchart illustrating an example of a method of controlling amount of light when an image is formed according to the embodiment.

FIG. 9 is a flowchart illustrating an example of a method of controlling amount of light when an image is formed according to this embodiment. At step S901, the image-formation start signal (START) from the engine controller and the PWM data from the PWM unit 200 are input to the controller 203. At step S902, the controller 203 turns off the switch SW2. As a result, the drive current is determined solely by the switching resistor RS and therefore the current value of the drive current is set to IH.

At step S903, the controller 203 determines the current application duration t. For example, the controller 203 determines the duty ratio of the drive current pulse from the PWM data and determines the current application duration t corresponding to the determined duty ratio of the drive current pulse. As mentioned above, the controller 203 is capable of reading the current application duration t, which corresponds to the determined duty ratio of the drive current pulse, from the look-up table. Thus, the controller 203 functions as one example of an adjusting unit for adjusting the current application duration t of the supplemental current ΔI so as to compensate for the amount of decrease in the pulse width of the light beam relative to the ideal width.

At step S904, the controller 203 starts outputting the data signal (DATA) to the laser driver 204. Further, the controller 203 resets the counter 202 and causes it to start counting in synch with the rising edge of the data signal. As a result, starts counting pulses that enter from the clock generator 201.

At step S905, the controller 203 monitors the value of the count in the counter 202 and determines whether the count value has attained the target current application duration t. If the count value has not attained the target current application duration t, then the switch SW2 is left in the off state. Accordingly, the value is held at the value IH of drive current by the switching resistor RS. That is, the state in which the supplemental current ΔI has been added to the usual current value IL is maintained.

On the other hand, if the count value has attained the target current application duration t, then control proceeds to step S906. Here the controller 203 turns on the switch SW2. As a result, the value of the drive current is set to IL by the switching resistor RS and variable resistor RV. That is, the value of the drive current is changed from the state in which the supplemental current ΔI has been added on to the usual current value IL.

At step S907, the controller 203 determines whether image formation ahs ended. If image formation has not ended, control returns to step S901.

In accordance with this embodiment, the supplemental current is added to the pulse-width modulated and generated drive current pulse at the leading edge portion thereof, thereby making it possible to reduce variations in optical pulse width and response time irrespective of the amount of light emitted.

In particular, according to this embodiment, supplemental current of a value corresponding to the set target amount of light is added to the drive current at the rising edge portion thereof. As a result, in comparison with the case where the supplemental current is not used, variations in optical pulse width and response time are reduced. It should be noted that the present invention according to this embodiment functions particularly effectively in a case where the light source has such a characteristic that the pulse width of the light beam becomes progressively smaller than the ideal width as the amount of light emitted declines.

Further, it is preferred that the value of the supplemental current be determined so as to compensate for the amount of decrease in the pulse width of the light beam relative to the ideal width. For example, it will suffice if the control circuit 101 determines the value of the supplemental current from the duty ratio of the drive current. The reason is that there is a relative relationship between the duty ratio of the pulse width and the duty ratio of the drive current.

It should be noted that in order to set the response time to a desired value, it is preferred that the application time of the supplemental current be adjusted so as to compensate for the amount of decrease in the pulse width of the light beam relative to the ideal width. The reason for this is that response time at the rising edge of the pulse is closely related to the duration of supplemental-current application.

Figure 10:
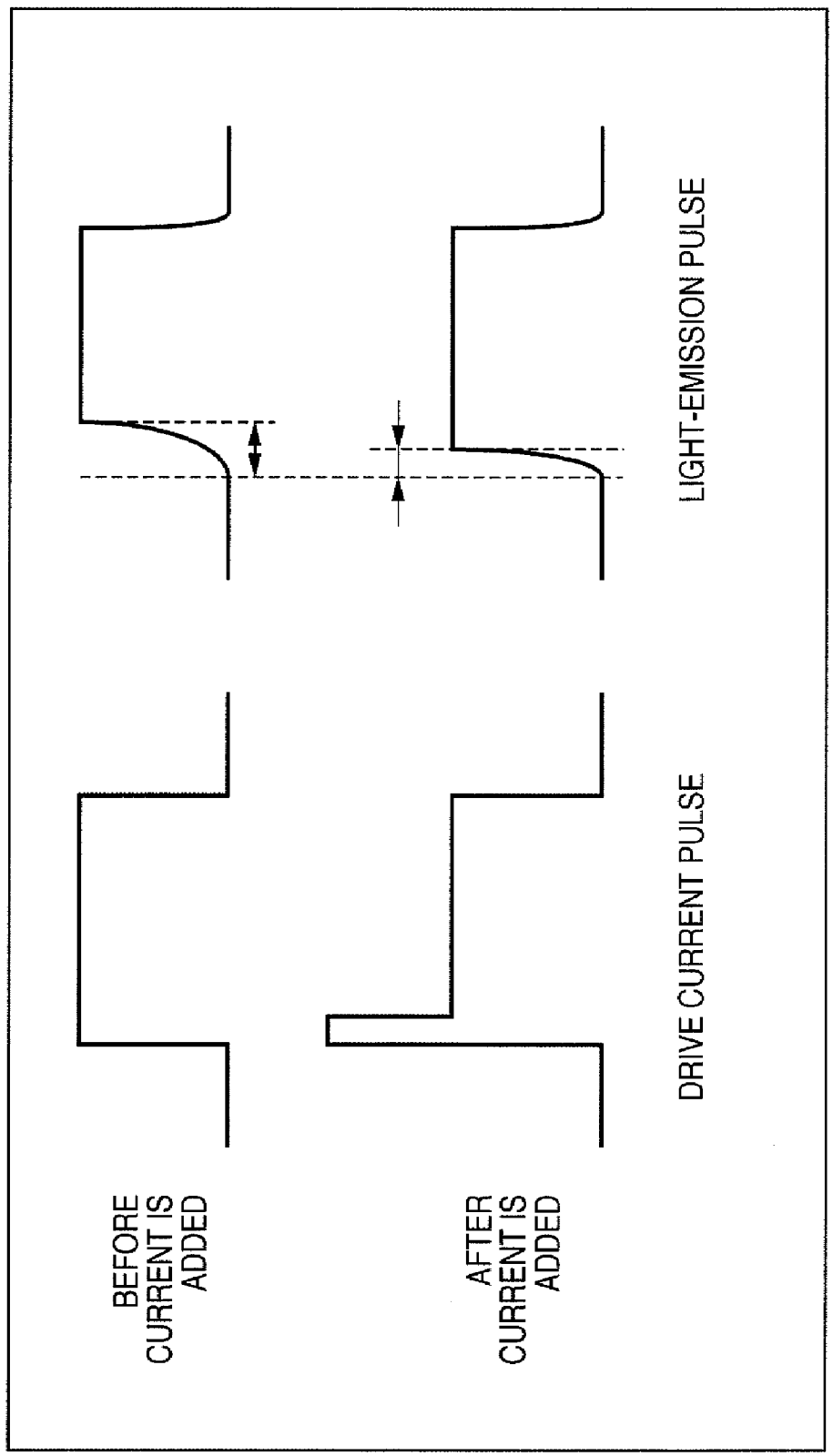
FIG. 10 is a diagram for visually describing the effects of the present invention according to the embodiment.

FIG. 10 is a diagram for visually describing the effects of the present invention according to this embodiment. Indicated at the top of FIG. 10 are a drive current pulse and light-emission pulse before application of the present invention according to this embodiment (i.e., before current is added on). On the other hand, indicated at the bottom of FIG. 10 are a drive current pulse and light-emission pulse following application of the present invention according to this embodiment (i.e., after current is added on).

In particular, if note is taken of both light-emission pulses, it will be understood that the response characteristic at the rising edge after application of the invention is improved in comparison with the situation before application of the invention. Consequently, according to the present invention, it is possible to reduce variations in optical pulse width and response time irrespective of the amount of light emitted.

Other Embodiments

The optical scanning apparatus described above can be applied to an image forming apparatus, by way of example.

As a result, variations in the density of formed images from one image forming apparatus to another can be reduced in comparison with the prior art.

Figure 11:
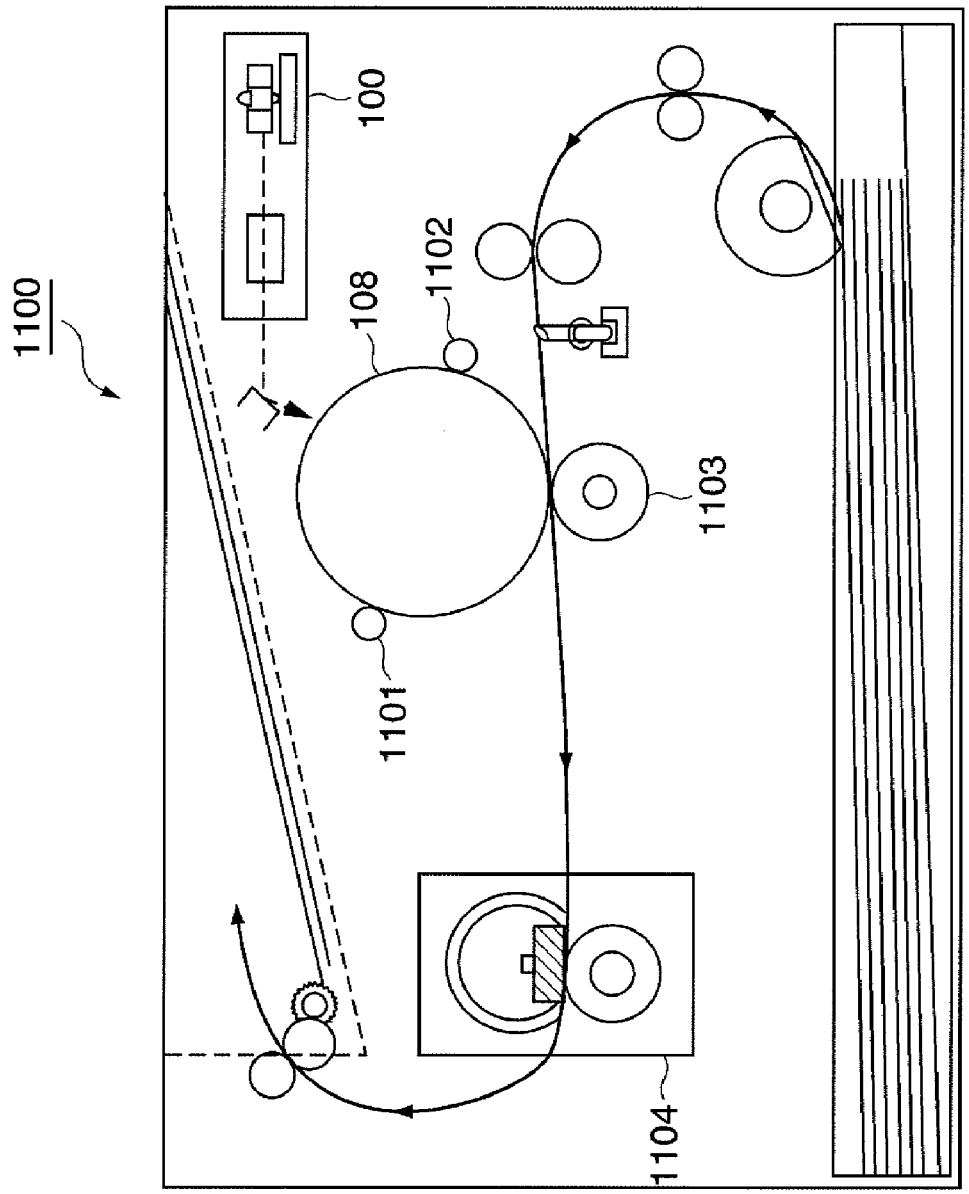
FIG. 11 is a schematic sectional view of an image forming apparatus according to the embodiment.

FIG. 11 is a schematic sectional view of an image forming apparatus 1100 according to the embodiment. By way of example, the image forming apparatus 1100 is implemented as a printing apparatus, image output apparatus, printer, copier, multifunction peripheral or facsimile machine.

Optical scanning apparatus 100 scans the surface of the photosensitive drum 108, which has been uniformly charged by a charging device 1101, with a light beam. An electrostatic latent image corresponding to an image signal is formed on the photosensitive drum 108, which is one example of an image carrier. Further, the electrostatic latent image is converted to a developer (toner, for example) image by a developing unit 1102. The developer image is transferred to a printing medium by a transfer unit 1103. A fixing unit 1104 fixes the developer image on the printing medium to which the developer image has been transferred from the photosensitive drum 108. The printing medium may also be referred to as printing paper, a sheet or transfer material, etc.

In accordance with the illustrated embodiment, variations in the density of formed images from one image forming apparatus to another can be reduced in comparison with the prior art by applying the above-described optical scanning apparatus to an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-128544, filed on May 14, 2007, which is hereby incorporated by reference herein in its entirety.

What is claimed is:

1. An optical scanning apparatus comprising:
a light source which emits a light beam;
a modulator which pulse-width modulates drive current supplied to said light source;
a current adding unit which adds a supplemental current to the pulse-width modulated drive current at the rising edge of a pulse thereof; and
a determining unit which determines the value of the supplemental current from a duty ratio of the drive current so as to compensate for amount of decrease in the pulse width of the light beam relative to the ideal width.

2. The apparatus according to claim 1, further comprising a setting unit which sets a target amount of light of the light beam;
wherein said current adding unit adds a supplemental current, which has a value corresponding to the set target amount of light, to the pulse-width modulated drive current at the rising edge of a pulse thereof.

3. The apparatus according to claim 2, wherein said light source has such a characteristic that the pulse width of the light beam becomes progressively smaller than an ideal width as the amount of light emitted declines.

4. An image forming apparatus comprising:
an image carrier;
a charging unit which charges said image carrier;
the optical scanning apparatus described in claim 1, said optical scanning apparatus forming an electrostatic latent image by scanning the surface of the image carrier with a light beam that conforms to image information;
a developing unit which forms a developer image by developing the electrostatic latent image;
a transfer unit which transfers the developer image to printing paper; and
a fixing unit which fixes the transferred developer image to the printing paper.

5. An optical scanning apparatus comprising:
a light source which emits a light beam;
a modulator which pulse-width modulates drive current supplied to said light source;
a current adding unit which adds a supplemental current to the pulse-width modulated drive current at the rising edge of a pulse thereof; and
an adjusting unit which adjusts duration of application of the supplemental current from a duty ratio of the drive current so as to compensate for amount of decrease in the pulse width of the light beam relative to the ideal width.

6. An image forming apparatus comprising:
an image carrier;
a charging unit which charges said image carrier;
the optical scanning apparatus described in claim 5, said optical scanning apparatus forming an electrostatic latent image by scanning the surface of the image carrier with a light beam that conforms to image information;
a developing unit which forms a developer image by developing the electrostatic latent image;
a transfer unit which transfers the developer image to printing paper; and
a fixing unit which fixes the transferred developer image to the printing paper.

7. A method of controlling drive current supplied to a light source that emits a light beam, said method comprising:
a modulation step of pulse-width modulating the drive current supplied to the light source; and
a current adding step of adding a supplemental current to the pulse-width modulated drive current at the rising edge of a pulse thereof; and
a determining step of determining the value of the supplemental current from a duty ratio of the drive current so as to compensate for amount of decrease in the pulse width of the light beam relative to the ideal width.

8. A method of controlling drive current supplied to a light source that emits a light beam, said method comprising:
a modulation step of pulse-width modulating the drive current supplied to the light source; and
a current adding step of adding a supplemental current to the pulse-width modulated drive current at the rising edge of a pulse thereof; and
an adjusting step of adjusting duration of application of the supplemental current from a duty ratio of the drive current so as to compensate for amount of decrease in the pulse width of the light beam relative to the ideal width.

* * * * *